Figure 1:
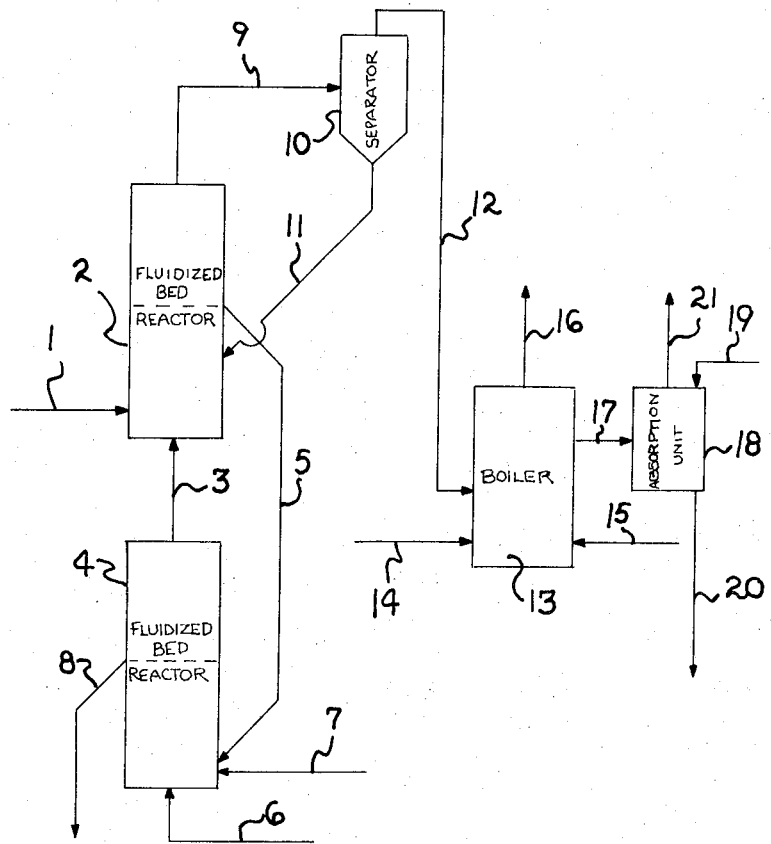

United States Patent [19]

Shick et al.

[11] 3,711,593

[45] Jan. 16, 1973

[54] FLUIDIZED PROCESS FOR REGENERATION OF CHEMICALS FROM SULFITE PULPING PROCESS

[75] Inventors: Philip E. Shick, Toledo, Ohio; William H. Flood, Acton, Mass.

[73] Assignee: Owens-Illinois, Inc.

[22] Filed: Aug. 12, 1971

[21] Appl. No.: 171,308

Related U.S. Application Data

[63] Continuation of Ser. No. 830,430, Jan. 4, 1969, abandoned.

[52] U.S. Cl. .................................. 423/207, 162/30
[51] Int. Cl. .............................................. C01d 5/14
[58] Field of Search ............... 23/48, 129, 63; 162/30

[56] References Cited

UNITED STATES PATENTS

| | | | |
|---|---|---|---|
| 3,322,492 | 5/1967 | Flood | 23/46 |
| 3,397,957 | 8/1968 | Smithson et al. | 23/129 |
| 3,523,864 | 8/1970 | Osterman et al. | 23/129 X |

FOREIGN PATENTS OR APPLICATIONS 678,130  1/1964  Canada ................................. 23/48

*Primary Examiner*—G. O. Peters
*Attorney*—P. L. Sabatine and E. J. Holler

[57] ABSTRACT

A method for regenerating a sodium base sulfite cooking liquor by utilizing a multi-stage fluid bed treatment. In the method for regenerating the liquor, the spent liquor is first treated in a fluid bed reactor with gases containing water vapor and carbon dioxide at a temperature less than 1100°F., to pyrolyze the liquor solids, to gasify the sulfur in the liquor and to produce a pelletized solid residue consisting of primarily sodium carbonate and carbon. This residue is then treated with air and water at a temperature greater than 1100°F. in a second fluid bed reactor to produce a solid product consisting primarily of sodium carbonate and gases suitable for use in the first reactor. The gaseous products of the first reactor are further oxidized with air to convert sulfur compounds to sulfur dioxide, which is then absorbed in a solution of sodium carbonate from the second reactor, thus regenerating sodium sulfite for preparation of pulping liquor.

6 Claims, 2 Drawing Figures

FLUIDIZED PROCESS FOR REGENERATION OF CHEMICALS FROM SULFITE PULPING PROCESS

This application is a continuation of application Ser. No. 830,430 filed Jan. 4, 1969 and now abandoned.

BACKGROUND OF THE INVENTION

The present invention relates to the recovery of pulping chemicals from pulping liquors as employed for the manufacture of pulp. More particularly, the invention is concerned with the treatment of pulping liquors for the recovery of pulping chemicals as employed in sulfite pulping, particularly neutral sulfite pulp processes. Specifically, the invention pertains to a novel process for the treatment of spent sulfite liquors by pyrolysis and the chemical treatment of said residual liquor solids to convert the latter to a product containing sodium carbonate and combustible gas products, and upon completion of the combustion of the gases, the sulfur dioxide formed is combined with sodium carbonate in solution to give sodium sulfite.

In the prior art it is generally known that liquors of the sodium base sulfite ($SO_3^-$) type may be used for the preparation of pulps from wood or from other cellulosic type fibrous materials. Often, the pulps produced from the heretobefore mentioned materials by the above sulfite technique may have better yields and better physical properties than pulps prepared with other pulping reagents. However, the commercial adoption of the sulfite pulping processes has been seriously limited by the lack of progress in the pulping art for the recovery or the regeneration of the utilized pulping chemical reagents. To date, may recovery processes have been proposed, but they have received limited art acceptance. Several of the proposed processes involve the combustion of the spent liquor under partially reducing conditions to give an inorganic smelt containing sodium sulfide ($Na_2S$) and sodium carbonate ($Na_2CO_3$) with the subsequent removal of the sulfur from the system as hydrogen sulfide ($H_2S$) by treatment of an aqueous solution of this smelt with carbon dioxide gas ($CO_2$) to form sodium carbonate or bicarbonate ($NaHCO_3$). The hydrogen sulfide formed in the carbonation step is eventually oxidized to sulfur dioxide ($SO_2$) and absorbed in the sodium carbonate solution to regenerate a cooking liquor. Still other known processes that have not met with commercial success remove the sodium ion ($Na^+$) from spent liquors with a cation exchange resin followed by concentrating and burning the residual spent liquor and absorbing the sulfur dioxide. The sulfur dioxide from the flue gases may also be used to recover sodium ions from the ion exchange resin to regenerate cooking liquors. Other processes are based on pyrolysis or gasification techniques, which use temperatures of about 700° to 800° C. (1292° to 1472° F.), in which spent pulping liquor is atomized either into a reactor with heated walls, i.e., the "atomized suspension technique," or into hot gases in a reaction chamber, i.e., "shock pyrolysis technique", to decompose and to give a solid containing primarily sodium carbonate and gases containing hydrogen sulfide. The hydrogen sulfide is burned to give sulfur dioxide, which is then combined with a solution of the sodium carbonate to regenerate the desired cooking liquor.

The literature basis for such gasification or pyrolysis processes was set forth in a thermodynamic paper by T. W. Bauer and R. M. Dorland, published in the *Canadian Journal of Technology*, Vol. 32, No. 3, pages 91–101, 1954. In particular, Bauer and Dorland showed that, for temperatures less than approximately 1340° F., in an equilibrium mixture of spent liquor pyrolysis products and at the proper controlled oxygen addition to give a gaseous mixture of $CO_2$, $CO$, $H_2$, and $H_2O$, the solid product should contain only sodium carbonate. At lower temperatures, i.e., at 980° F. and below, carbon also begins to appear in the equilibrium mixture, particularly, at lower oxygen levels. At any temperature, at very low oxygen levels, i.e., in the presence of $CO$ and $H_2$ as opposed to $CO_2$ and $H_2O$, sodium sulfide will be found in the equilibrium solid product; whereas, at high oxygen levels, i.e., in the presence of $CO_2$ and $H_2O$ as opposed to $CO$ and $H_2$, sodium sulfate becomes a stable solid product. It has been an object of the above pyrolysis processes to operate at a temperature and oxygen level so as to obtain a solid product consisting of sodium carbonate. In practice, this has been only partially achieved under the best conditions of fine atomization and rapid pyrolysis, the product containing significant percentages of both carbon and sulfate.

Prior attempts to achieve a similar gasification of sulfur and carbon by introducing sodium base sulfite spent liquor into a fluidized bed have not been successful. Various problems associated with operating a fluid bed under reducing conditions, such as the problem of balling up or stickiness of particles in the fluid bed, as well as incomplete removal of the sulfur and carbon, have not been overcome to make the systems suitable for manufacturing acceptance. Other fluid bed processes consist of spraying sulfite spent liquors into the free board above a fluidized bed or directly into a fluidized bed operating under oxidizing conditions and at a temperature of approximately 1350° F. Under these conditions essentially all the sulfur in the spent liquor remains in the fluidized bed product as sodium sulfate. The latter compound, sodium sulfate, is inert and unusable in the pulping reaction. One proposal has been made for the treatment of spent sulfite liquors in such an oxidizing bed to give a product containing sodium sulfate and sodium carbonate, followed by a subsequent fluid bed treatment under reducing conditions to reduce the sodium sulfate to sodium sulfide and to remove the sulfur in the form of hydrogen sulfide. The hydrogen sulfide may be burned to give sulfur dioxide, which may be combined with the sodium carbonate produced in the process. The feature of this just-described process that prevents its commercial advancement is the requirement for additional fuel to carry out the second reduction and the sulfur elimination step.

In view of the above discussion, it therefore becomes obvious that the present invention has as one of its objects to make available to the pulping art an acceptable method for the recovery of chemicals from spent pulping liquor.

It is a further object of the invention to produce a chemically simple and economic process for recovering chemicals from the waste liquor obtained from a cooking of cellulose type materials such as wood.

Yet still a further purpose of the invention is to provide an improved chemical recovery for sulfite liquors based on the pyrolysis and treatment of residual liquor solids to convert them to sodium carbonate and gaseous products which, upon completion of combustion, contain sulfur dioxide and the formation of sodium sulfite by the combination of the sodium carbonate in the solution with the sulfur dioxide.

It is another object to provide a rapid and continuous process so as to make it possible to recover costly chemicals from spent pulping liquors.

These and other objects of the invention will become more apparent from the following detailed description and the accompanying claims.

SUMMARY OF THE INVENTION

In the present invention, it has been found possible to operate a fluidized bed with introduction of spent sodium base sulfite liquor under reducing conditions to give a granular solid product containing both sodium carbonate and carbon and gaseous products containing hydrogen sulfide. To achieve this, it has been essential to maintain a very high rate of circulation in the fluidized bed, by the use of a so-called "spouted" fluid bed, and to maintain the bed temperature below approximately 1100° F., thus avoiding the stickiness and balling up previously found.

The present process utilizes a two-step fluid bed treatment. In the first step, spent sodium base sulfite liquor at about 35 to 55 percent solids is introduced into a rapidly circulating fluid bed and intimately treated with gases containing $CO_2$, $CO$, $H_2O$, and $H_2$ at a temperature less than 1100° F. and preferably less than 980° F., to give approximately the equilibrium mixture of sodium carbonate and carbon in the solid product with product gases containing hydrogen sulfide. The solid product from this first stage is then treated with air and small additions of water in a second fluid bed stage at temperatures greater than 1100° F., but less than the fusion point of sodium carbonate, preferably at about 1350° F., to burn off the residual carbon and to give a solid product consisting primarily of sodium carbonate and hot gaseous products containing $CO_2$ and $H_2O$, as well as small amounts of $O_2$.

The hot gases from the second fluid bed step are passed continuously into the first fluid bed to react therewith the spent liquor; to produce the desired gaseous atmosphere and solid products in the first stage bed. In a further step, the gaseous products from the first stage bed are combined with more air and burned under a boiler to provide steam and flue gases containing $SO_2$ and $CO_2$. The sodium carbonate product from the second bed may, if desired, be passed through a third fluid bed countercurrent to the combustion air for the second stage bed to preheat that air and to cool the product. Whether discharged directly or through a preheating bed, it is finally dissolved in water and the resulting solution used to scrub the flue gases from the boiler to recover the $SO_2$ contained therein, and to regenerate $Na_2SO_3$, suitable for cooking liquor preparation.

The temperature in the first fluid bed stage is controlled by adjustments to either or both the concentration of the spent liquor introduced into the bed or the total air used in the fluid bed system; the higher the concentration or the more air used, the higher the temperature. In practice, the desired gaseous mixture, including a suitable balance of $CO_2$, $CO$, $H_2O$, and $H_2$, as well as $H_2S$, and also a thermal balance are achieved when the gases entering the first bed contain approximately 20 to 30 percent of the $O_2$ theoretically required for complete combustion of the spent sulfite liquor being processed. The temperature in the second stage fluid bed is controlled by the relative rate of water addition to that bed.

DESCRIPTION OF THE INVENTION

In obtaining the objects of the present invention, it has been found that an unobvious process can be made available for the regeneration of a sodium sulfite cooking liquor, without recourse to the employment of additional fuel. The process is a multi-stage fluid bed treatment in which the spent liquor is sprayed into a first fluid bed treatment stage which is operated under reducing conditions for the removal of sulfur compounds. Also, in said process, carbon is removed by its combustion with air, as well as by its reaction with tempering water in a second fluidized bed stage which furnishes much of the heat and the reducing gases for the first stage treatment of the spent liquor. The process of the invention can be characterized by other inventive features such as the control of temperature by control of the concentration of the spent liquor as introduced into the first stage and by regulating the quantity of water introduced into the second stage. The invention also produces the added inventive advantage of utilizing of the heats formed by the pyrolysis and of the oxidation of the liquor to furnish the necessary heat for the reactions, and to complete the combustion of the gases from the fluid bed treatment by combustion with air to generate steam in a conventional boiler. This utilization is accomplished by control of the conditions in the first stage fluid bed treatment, generally, by maintaining the temperature in the bed at a temperature below approximately 1100° F. and by promoting very rapid recirculation of the bed contents while maintaining reducing conditions and by providing sufficient retention time in this stage to permit the system to approach equilibrium.

Figure 2:
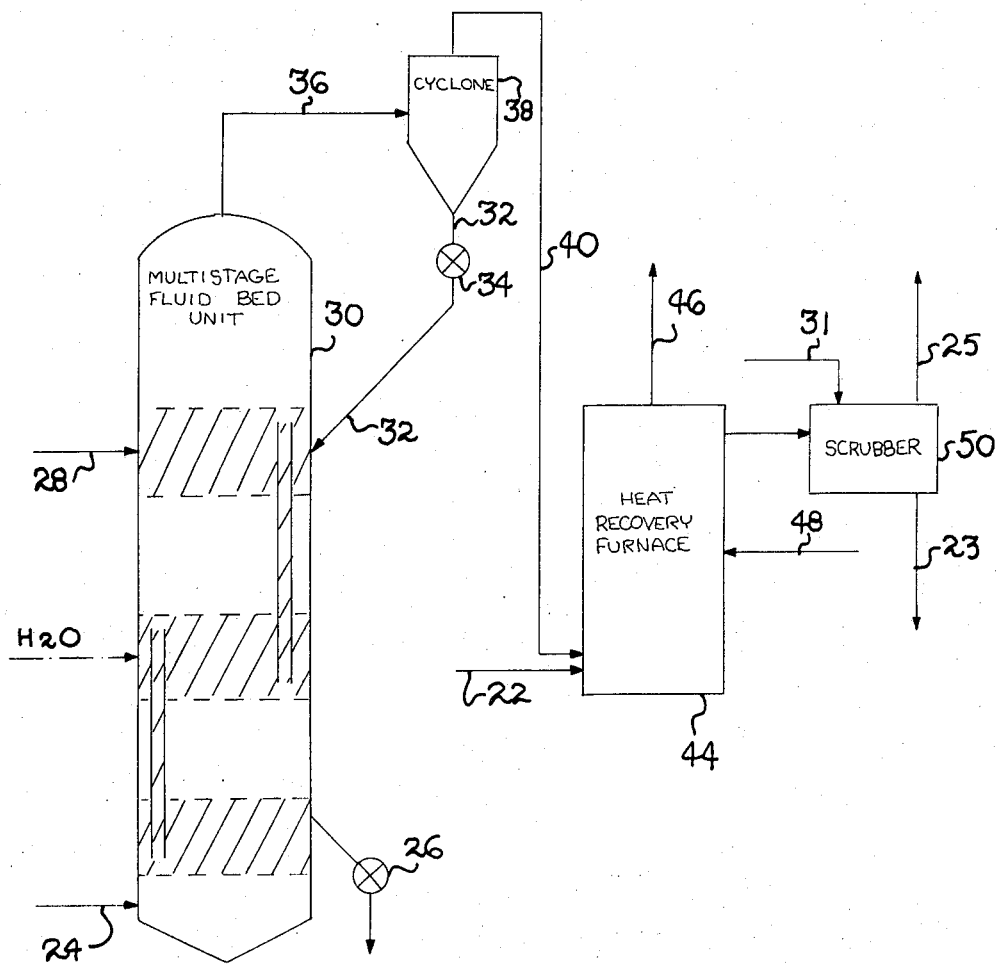

The invention will now be further described in more detail in connection with the accompanying drawings in which FIG. 1 illustrates a two-stage fluidized bed reactor for carrying out the invention, and FIG. 2 depicts and optional arrangement with cooling of the product and preheating of the combustion air in a third fluid bed stage, and incorporation of all three stages in a single housing.

Turning now in detail to FIG. 1, concentrated spent sulfite liquor is introduced by line 1 into the first stage fluidizer bed reactor 2, in which the liquor is dried and pyrolyzed in the presence of gases introduced at 3 from the second stage fluidized bed reactor 4. The solid product from the first stage reactor consisting primarily of sodium carbonate and carbon essentially free of sulfur overflows into line 5 from fluidized bed reactor 2 through conduit 5 into the second stage fluidized bed reactor 4. Carbon is removed by combustion with air introduced into the fluidized bed 4 by air inlet 6, while water is introduced into the bed 4 through line 7 to keep the temperature in the reactor from rising above the fusion point of the sodium carbonate product. This product is discharged through overflow line 8. It may be further cooled in still a third stage fluid bed treatment with the air to be supplied at 7, if desired, and it can be conveyed to storage or dissolved to form a solution of sodium carbonate for further use in the process. The gaseous products containing most of the sulfur from the first stage reactor 2 are conducted through conduit 9 to a cyclone separator 10 to remove entrained fines which are returned to reactor 2 through means 11. The gaseous products are conducted through conduit 12 to boiler 13 where they are burned with air which enters boiler 13 through air feed 14, and the gases produced are conveyed after combustion through line 17 to an absorption unit 18 where the sulfur dioxide is absorbed in a sodium carbonate solution introduced at 19 into the absorption unit 18 to form a sulfite solution that is discharged through line 20. Water is introduced into boiler 13 through pipe 15 for temperature control and salvation and the steam produced during the burning of the fines is discharged at 16. The sulfur free gases of absorption unit 18 are discharged to the atmosphere through line 21. The temperature in the first stage reactor 2 is maintained below about 1100° F., generally in the range of 800° F. to 1000° F., by adjustment of the controlled concentration of the spent liquor, which spent liquor is introduced into the reactor 2 by means 1.

Turning now in detail to FIG. 2, which figure fully illustrates a detailed embodiment of a multi-stage fluid bed for carrying out the invention. In the drawing, black liquor is introduced at 28 into the upper part of a multistage fluid bed unit 30 where the liquor is deposited upon granules of previously pyrolyzed liquors and brought into intimate contact with hot pyrolysis gases. The black liquor under these conditions in the first stage bed of 30 is decomposed into carbon, sodium carbonate and gaseous products such as hydrogen sulfide, carbon dioxide, carbon monoxide and water vapor. The gases then leave unit 30 through conduit 36 and pass into the cyclone separator 38. The dust is separated in the cyclone, passes through control 34 by means of conduit 32 back into unit 30. The gases leave the cyclone through line 40 and enter the heat recovery furnace unit 44 where the gases are burned in an air atmosphere. Air enters the furnace through line 22, and in said furnace the sulfur type compounds are converted to sulfur dioxide. Water is fed through line 48 into a heat recovery boiler, which is a part of the furnace 44, and steam for evaporation of the liquor or for other uses is withdrawn at 46. After combustion and cooling in the heat recovery furnace 44, the gases may be scrubbed with a sodium carbonate solution to recover the sulfur dioxide in the form of sodium sulfite.

The solid product from the upper fluidized bed of 30 overflows into the second or intermediate fluidized bed where the carbon is burned off and any small sulfur residue is converted to sulfate using air entering at 24. The temperature in this second bed will be maintained below the fusion point of the inorganic salts, i.e., below about 1550° F. for sodium carbonate, and preferably at about 1350° F. The oxidized product from the second bed of 30 is cooled in a third fluidized bed by passing the combustion air entering at 24 through it with simultaneous preheating of the combustion air. If a more countercurrent heat recovery is desired, more than one such product cooling and air heating step may be employed. The sodium carbonate product is discharged from the multi-stage fluidized bed unit 30, is dissolved in water and enters by feed 31 scrubber 50 where it is converted to sodium sulfite and leaves through exit conduit 23. The sulfur free gases are discharged into the atmosphere through line 25.

The following examples will further define the invention, but they are not to be construed as limiting, as other embodiments will be evident to those skilled in the art from the accompanying examples.

EXAMPLE 1

A bed of granules of sodium carbonate was made in a fluidized bed reactor. The reactor was six inches in diameter and had a bed height of thirty inches, operated under spouting conditions by introduction of the fluidizing gases through an opening one-half inch in diameter in the bottom plate, and using a mixture of carbon dioxide, nitrogen, hydrogen and water vapor as the fluidizing gas with a superficial gas velocity of approximately 1 to 3 feet per second. This spouted fluidized bed is further described in U.S. Pat. No. 2,786,280. A solution of spent sulfite liquor at approximately 40% total solids was introduced into the reactor through a spray nozzle positioned approximately fourteen inches from the bottom of the reactor. The spent liquor was introduced at a rate of fifteen pounds per hour while the temperature in the reactor was maintained between 520° to 580° C. A solid pelletized product was obtained, without losing fluidization in the bed.

EXAMPLE 2

The procedure employed in Example 1 was repeated herein and all conditions were as previously described. In this run, the bed was operated with a mixture of nitrogen and an air supply as the fluidizing gas and the temperature of the reactor was 520° to 590° C. without a loss of any fluidization.

EXAMPLE 3

The same procedure as was employed in Example 2 was repeated in this run, and all conditions were as previously described, except that the temperature of the reactor was 420° to 540° C., and the run was performed without loss of fluidization.

EXAMPLE 4

The procedure was, as set forth in Examples 2 and 3, repeated for the run. At a temperature of 620° C., there was a loss of fluidization.

EXAMPLE 5

The decomposition of black liquor was accomplished in a six inch diameter stainless steel fluid bed unit. The fluidizing gases were preheated and then fed through the deck plate at the base, and additional heat to make up for heat losses from the uninsulated metal tube was supplied externally by auxiliary burners. The off gases were passed through a conventional cyclone separator to remove the fines and then into a venturi scrubber for final cleanup. The black liquor was prepared by adding thirteen pounds of solid salt cake to one hundred pounds of black liquor received from a commercial pulping plant. It was then pumped through a suitable nozzle and sprayed into the bed of solids in the reactor. The solids resulting from the decomposition were deposited on the bed particles which, in turn, were withdrawn as spheres or prills from the overflow pipe. The bed temperature was maintained below 600° C. to prevent any possible sticking and defluidization of the bed. The superficial velocities in the bed ranged from 0.5 to 3 feet per second. Generally, the fluidized bed was operated at 1.0 feet per second. The height of the bed was 30 inches. Inlet gas temperatures of 500° to 600° C. were obtained by external preheating of the gases. The initial bed for this run was sodium carbonate.

EXAMPLE 6

The procedure described in Example 5 was repeated for this run, except that a bed of sand was used. The bed was successfully fluidized and run. Black liquor was fed to the bed which was at a temperature of 480° to 580° C. In the succeeding runs, the sand in the bed was displaced by prills built up from the black liquor solids.

Although the invention has been described and illustrated in detail, it is to be understood that the same is by way of illustration and example only and it is not to be taken by way of limitation.

What is claimed is:
1. A method of regenerating a spent sodium base sulfite cooking liquor utilizing a multi-stage fluid bed treatment, the method comprising the steps of:
  1. treating the spent sulfite liquor in a first stage spouted fluid bed reactor under reducing conditions at a temperature less than about 1100° F. with gases containing $CO_2$ and water vapor with the necessary degree of recirculation to provide fluidization within the bed and eliminate the balling up and stickiness of the bed particles, to convert the sulfur in the spent liquor into gaseous products including $H_2S$ and to provide a residue consisting essentially of sodium carbonate and carbon,
  2. treating the solid product of the first stage in a second stage fluid bed with air and water at a temperature greater than about 1100° F. to provide a solid sodium carbonate product and gases containing $CO_2$ and water vapor that are suitable for use in the first stage,
  3. simultaneously while performing step (2), oxidizing the gaseous products of step (1) to obtain oxidized gaseous products, including sulfur dioxide, and
  4. scrubbing the oxidized gaseous products of step (3) with an aqueous solution of sodium carbonate of step (2) to provide a sulfited cooking liquor.

2. A method according to claim 1, in which the temperature in the first stage reactor is controlled by the concentration of the spent liquor introduced into the reactor and by the oxygen content of the gases introduced into the reactor.

3. In a method of regeneration of cooking chemicals from spent, semi-chemical, neutral sulfite pulping liquors, wherein said method consists essentially of the steps of:
  reacting the spent liquor in a first stage spouted fluidized bed reactor with reducing conditions and a temperature not substantially greater than about 1100° F. to provide gaseous products that remove sulfur therein, and to provide a solid product;
  maintaining fluidization in the spouted bed by recirculation of the bed particles to reduce stickiness of the particles;
  reacting the solid product of the first stage reactor in a second stage fluidized bed reactor with air and water to remove carbon and provide sodium carbonate as the solid product;
  reacting the sulfur containing gases from the first stage reactor with air to form a gaseous product containing sulfur dioxide; and
  scrubbing of the gaseous product with a solution of sodium carbonate to form sodium sulfite for reuse as a pulping liquor.

4. The method according to claim 3, wherein heat produced from reacting the gases from the first stage reactor is recovered.

5. A method of regeneration of cooking chemicals from spent, semi-chemical, neutral sulfite pulping liquors, the method comprising the steps of:
  A. reacting the spent sulfite liquor in a first stage spouted fluid bed under reducing conditions with gases containing carbon dioxide and water vapor with sufficient recirculation within the bed to provide fluidization to provide the reaction without the balling up and stickiness of the bed particles, to convert the sulfur in the spent liquor into gaseous products and to provide a solid residue product consisting essentially of sodium carbonate and carbon,
  B. treating the solid product of step (A) in a second stage fluidized bed reactor with air to remove the carbon from the solid product,
  C. oxidizing the sulfur in the gaseous products of step (A) to sulfur dioxide, and
  D. scrubbing the oxidized gaseous products of step (C) with a solution of sodium carbonate to form sodium sulfite for reuse as a pulping liquor.

6. A method as defined in claim 5 in which the reacting in step (A) is conducted at a temperature less than about 1100° F.

* * * * *